(12) United States Patent
Da et al.

(10) Patent No.: US 11,465,930 B2
(45) Date of Patent: Oct. 11, 2022

(54) FLEXIBLE ULTRATHIN GLASS WITH HIGH CONTACT RESISTANCE

(71) Applicant: SCHOTT Glass Technologies (Suzhou) Co. Ltd., Suzhou (CN)

(72) Inventors: Ning Da, Suzhou (CN); Feng He, Suzhou (CN); Jiaqi Meng, Suzhou (CN); Mathew Shan, Suzhou (CN)

(73) Assignee: Schott Glass Technologies (Suzhou) Co. Ltd., Suzhou (CN)

( * ) Notice: Subject to any disclaimer, the term of this patent is extended or adjusted under 35 U.S.C. 154(b) by 0 days.

(21) Appl. No.: 16/700,577

(22) Filed: Dec. 2, 2019

(65) Prior Publication Data
US 2020/0109079 A1 Apr. 9, 2020

Related U.S. Application Data

(63) Continuation of application No. PCT/CN2017/087100, filed on Jun. 2, 2017.

(51) Int. Cl.
*B32B 15/04* (2006.01)
*B32B 17/06* (2006.01)
*C03C 3/091* (2006.01)
*C03C 3/085* (2006.01)

(52) U.S. Cl.
CPC ............ *C03C 3/091* (2013.01); *C03C 3/085* (2013.01)

(58) Field of Classification Search
CPC .................................. C03C 3/091; C03C 3/085
USPC ........................................ 428/410, 426, 428
See application file for complete search history.

(56) References Cited

U.S. PATENT DOCUMENTS

| | | | |
|---|---|---|---|
| 8,168,295 B2 | 5/2012 | Murata | |
| 9,212,084 B2 | 12/2015 | Wang et al. | |
| 10,974,990 B2 | 4/2021 | Da et al. | |
| 2015/0030834 A1 | 1/2015 | Morey et al. | |
| 2015/0183680 A1 | 7/2015 | Barefoot et al. | |
| 2015/0210589 A1* | 7/2015 | Chang .................. | H05K 1/0306 428/220 |
| 2015/0258750 A1* | 9/2015 | Kang ...................... | B29C 65/54 428/174 |

(Continued)

FOREIGN PATENT DOCUMENTS

| | | |
|---|---|---|
| CN | 102167509 A | 8/2011 |
| CN | 106746603 A | 5/2017 |

(Continued)

OTHER PUBLICATIONS

International Search Report and Written Opinion dated Feb. 22, 2018 for International Application No. PCT/CN2017/087100 (9 pages).

(Continued)

*Primary Examiner* — Lauren R Colgan
(74) *Attorney, Agent, or Firm* — Taylor IP, P.C.

(57) ABSTRACT

An ultrathin chemically toughened glass article has a thickness of no more than 0.4 mm. In order to improve the sharp impact resistance, the glass article has a breakage height (given in mm) of more than 50 multiplied by the thickness (t) of the glass article (given in mm). Further, it has a breakage bending radius (given in mm) of less than 100000 multiplied by the thickness (t) of the glass article (given in mm) and divided by the figure of the surface compressive stress (in MPa) measured at the first surface.

16 Claims, 3 Drawing Sheets

(56) References Cited

U.S. PATENT DOCUMENTS

| | | | |
|---|---|---|---|
| 2016/0002103 A1* | 1/2016 | Wang | C03B 17/06 428/141 |
| 2017/0081239 A1 | 3/2017 | Schwall et al. | |
| 2017/0313622 A1* | 11/2017 | Ogami | C03C 21/00 |
| 2021/0269353 A1* | 9/2021 | Gross | C03C 21/002 |

FOREIGN PATENT DOCUMENTS

| | | | |
|---|---|---|---|
| JP | 2015-34107 A | 2/2015 | |
| WO | 2014/139147 A1 | 9/2014 | |
| WO | 2015/127583 A1 | 9/2015 | |

OTHER PUBLICATIONS

Japanese Office Action dated Jan. 6, 2021 for Japanese Application No. 2019-548019 (14 pages).
Translation of Japanese Office Action dated Jan. 6, 2021 for Japanese Application No. 2019-548019 (21 pages).
Chinese Office Action dated Aug. 3, 2021 for Chinese Application No. 201780091519.7 (9 pages).
English translation of Chinese Office Action dated Aug. 3, 2021 for Chinese Application No. 201780091519.7 (10 pages).
Korean Office Action dated Sep. 15, 2021 for Korean Application No. 10-2019-7027286 (4 pages).
English Translation of Korean Office Action dated Sep. 15, 2021 for Korean Application No. 10-2019-7027286 (4 pages).
Japanese Office Action dated Dec. 6, 2021 for Japanese Patent Application Serial No. 2019-548019 (12 pages).
English translation of Japanese Office Action dated Dec. 6, 2021 for Japanese Patent Application Serial No. 2019-548019 (17 pages).
Japanese Office Action dated Jun. 20, 2022 for Japanese Patent Application No. 2019-548019 (10 pages).
English translation of Japanese Office Action dated Jun. 20, 2022 for Japanese Patent Application No. 2019-548019 (13 pages).
Korean Office Action dated Jul. 11, 2022 for Korean Patent Application No. 10-2019-7027286 (4 pages).
English translation of Korean Office Action dated Jul. 11, 2022 for Korean Patent Application No. 10-2019-7027286 (4 pages).

\* cited by examiner

FLEXIBLE ULTRATHIN GLASS WITH HIGH CONTACT RESISTANCE

CROSS REFERENCE TO RELATED APPLICATIONS

This is a continuation of PCT application No. PCT/CN2017/087100, entitled "FLEXIBLE ULTRATHIN GLASS WITH HIGH CONTACT RESISTANCE", filed Jun. 2, 2017, which is incorporated herein by reference.

BACKGROUND OF THE INVENTION

1. Field of the Invention

The present invention is related to an ultrathin glass article with both high sharp contact resistance and high flexibility. The present invention is also related to use of the high strength flexible glass as flexible universal plane in flexible and printed electronics, sensor for touch control panels, finger print sensors, thin film battery substrates, mobile electronic devices, semiconductor interposers, bendable displays, solar cells, or other applications where a combination of high chemical stability, temperature stability, low gas permeability, flexibility, and low thickness is necessary. Besides consumer and industrial electronics, exemplary embodiments provided according to the present invention can also be used for protection applications in industrial production or metrology.

2. Description of the Related Art

Thin glasses with different compositions are suitable substrate material for many applications where transparency, high chemical and thermal resistance, and defined chemical and physical properties are important. For example, alkaline free glasses can be used for display panels and as electronic packaging materials in wafer format. The alkaline contained silicate glasses are used for filter coating substrate, touch sensor substrate, and fingerprint sensor module cover.

Aluminosilicate (AS), lithium aluminosilicate (LAS), borosilicate and soda-lime glasses are widely used for applications such as covers for finger print sensor (FPS), protection cover, and display cover. In these applications, the glasses usually will be chemically toughened to achieve a high mechanical strength, as determined by special tests, e.g. 3-point bending (3PB), ball drop, anti-scratch and others.

Chemical toughening is a well-known process to increase strength of glass like soda lime glass or aluminosilicate (AS) glass or lithium aluminosilicate (LAS) or borosilicate glass that is used as cover glass for display applications, for example. In this circumstance, the surface compressive stresses (CS) are typically between 500 and 1,000 MPa and the depth of the ion-exchange layer is typically bigger than 30 μm, such as bigger than 40 μm. For safety protection applications in transportation or aviation, AS Glass could have exchange layers bigger than 100 μm. Normally, a glass having both high CS and high DoL is targeted for all these applications, and thickness of glass usually ranges from about 0.5 mm to 10 mm.

In present times, the continuous demand for new functionality of product and wider area of applications call for glass substrates even thinner and lighter with high strength and flexibility. The fields in which ultrathin glass (UTG) is typically applied are protective cover of fine electronics. At the present time, the increasing demands for new functionalities of products and exploiting new and broad applications call for thinner and lighter glass substrates with new properties such as flexibility. Due to the flexibility of UTG such glasses have been searched and developed as cover glasses and displays for devices such as, for example, smartphones, tablets, watches and other wearables. Such a glass can also be used as a cover glass of a finger print sensor module and as camera lens cover.

However, if glass sheets get thinner than 0.5 mm, handling will get more and more difficult mainly due to defects such as cracks and chippings at the glass edges which lead to breakage. Also, the overall mechanical strength i.e. reflected in bending or impact strength will be significantly reduced. Usually the edge of thicker glass can be CNC (computer numerical control) grinded to remove the defects, but, the mechanical grinding is hardly applied for ultrathin glass with thickness less than 0.3 mm. Etching on the edge could be one solution for ultrathin glass to remove defects, but the flexibility of thin glass sheet is still limited by the low bending strength of glass itself. As a result, strengthening of the glasses is extremely important for thin glasses. However, for ultrathin glass strengthening is always accompanied by the risk of self-breakage due to high central tensile stress of glass.

Typically, <0.5 mm thick flat ultrathin glasses can be produced by direct hot-forming methods such as down draw, overflow fusion or special float procedures. Redraw methods are also possible. Compared with post-treated thin glass by chemical or physical method (e.g. produced via grinding and polishing), the direct hot-formed thin glass has much better surface uniformity and surface roughness because the surfaces are cooled down from high temperature melting state to room temperature. Down-drawn method could be used to produce glass thinner than 0.3 mm or even 0.1 mm, such as aluminosilicate glasses, lithium aluminosilicate glasses, alkali borosilicate glasses, soda lime glasses or alkaline free aluminoborosilicate glasses.

Chemical toughening of UTG has been described by some inventions. US2015183680 describes a toughening of <0.4 mm glass with limited range of central tension range and DoL>30 μm. However, DoL>30 μm leads to problems like fragility and self-breakage in ultrathin toughened glass. Furthermore, how the <0.4 mm thick glass is prepared is not illustrated in this patent application. WO 2014/139147 A1 discloses a toughening of <0.5 mm glass with compressive stress <700 MPa and DoL <30 μm. But here again, ultrathin toughened aluminosilicate glasses tend to have low mechanical resistance and break easily upon contact with sharp and hard objects. Generally, in order to get flexible glasses with an optimal bending radius it was assumed that DoL (the depth of the ion-exchanged layer) should reach a high value of approximately 0.1 to 0.2 times of the respective glass thickness (given in μm). On the contrary, it was found that known toughened ultrathin glasses have a quite low sharp contact resistance (this means sharp impact resistance). Thus such toughened glasses can be easily broken when being punched by hard objects such as edges. Sharp impact resistance is the property of the UTG to withstand impact forces wherein an article is dropped and the surface of the glass gets in contact with a sharp object.

There are so many glass thicknesses, toughening procedures and results (different CS, DoL, CT) in connection with UTG that it is serious to predict whether a glass article can be used within a special application or not. However, testing finished actual products (e.g. by dropping objects onto a fingerprint sensor until it breaks) is not only inefficient but also wastes the product itself. In order to reduce the risk of damage at the customer side, many tests have been developed to prove the contact resistance and flexibility of a toughened ultrathin glass. For example, 3-point bending (3PB), ball drop, anti-scratch and others. However, those tests are elaborate and often fail.

What is needed in the art is a way to provide an ultrathin glass which can achieve both high flexibility and high sharp contact resistance and to set evaluation criteria for UTG having reliable properties for electronic applications.

SUMMARY OF THE INVENTION

In some exemplary embodiments provided according to the present invention, a chemically toughened glass article comprises a glass and has a thickness t of less than 0.4 mm, a first surface, and a second surface and a compressive stress region extending from the first surface to a first depth in the glass article DoL, the compressive stress region being defined by a compressive stress and a surface compressive stress at the first surface is at least 100 MPa, the glass article having a breakage height, in mm, of at least a figure of the thickness, in mm, of the glass article multiplied by 50, the breakage height being determined in a sandpaper ball drop test in which the glass article is placed with its second surface on a steel plate and the first surface of the glass article is loaded until breakage by a 4.5 g acrylic ball dropped from above and a sandpaper of type P180 is placed on the first surface of the glass article with an abrasive side of the sandpaper in contact with the first surface, the glass article having a breakage bending radius, in mm, of less than the thickness, in mm, of the article multiplied by 100000. The result is divided by the figure of the surface compressive stress, in MPa, measured at the first surface.

In some exemplary embodiments provided according to the present invention, a laminated layered structure includes at least two ultrathin glass layers and an organic layer placed between the at least two ultrathin glass layers. At least one of the ultrathin glass layers comprises a glass and has a thickness t of less than 0.4 mm, a first surface, and a second surface and a compressive stress region extending from the first surface to a first depth in the glass layer DoL, the compressive stress region being defined by a compressive stress and a surface compressive stress at the first surface is at least 100 MPa, the at least one ultrathin glass layer having a breakage height, in mm, of at least a figure of the thickness, in mm, of the at least one ultrathin glass layer multiplied by 50, the breakage height being determined in a sandpaper ball drop test in which the at least one ultrathin glass layer is placed with its second surface on a steel plate and the first surface of the at least one ultrathin glass layer is loaded until breakage by a 4.5 g acrylic ball dropped from above and a sandpaper of type P180 is placed on the first surface of the at least one ultrathin glass layer with an abrasive side of the sandpaper in contact with the first surface, the at least one ultrathin glass layer having a breakage bending radius, in mm, of less than the thickness, in mm, of the layer multiplied by 100000. The result is divided by the figure of the surface compressive stress, in MPa, measured at the first surface.

In some exemplary embodiments provided according to the present invention, a method of producing a chemically toughened glass article includes: providing a composition of raw materials; melting the composition; producing a glass article in a flat glass process, the glass article having a thickness t of less than 0.4 mm, a first surface, and a second surface; and chemically toughening the glass article at a toughening temperature for a toughening time. The chemically toughened glass article has a compressive stress region extending from the first surface to a first depth in the glass article DoL, the compressive stress region being defined by a compressive stress and a surface compressive stress at the first surface is at least 100 MPa, the glass article having a breakage height, in mm, of at least a figure of the thickness, in mm, of the glass article multiplied by 50, the breakage height being determined in a sandpaper ball drop test in which the glass article is placed with its second surface on a steel plate and the first surface of the glass article is loaded until breakage by a 4.5 g acrylic ball dropped from above and a sandpaper of type P180 is placed on the first surface of the glass article with an abrasive side of the sandpaper in contact with the first surface, the glass article having a breakage bending radius, in mm, of less than the thickness, in mm, of the article multiplied by 100000. The result is divided by the figure of the surface compressive stress, in MPa, measured at the first surface, the toughening temperature is between 340° C. and 480° C., and the toughening time is between 30 seconds and 48 hours.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Explanation of Technical Terms

Figure 1:
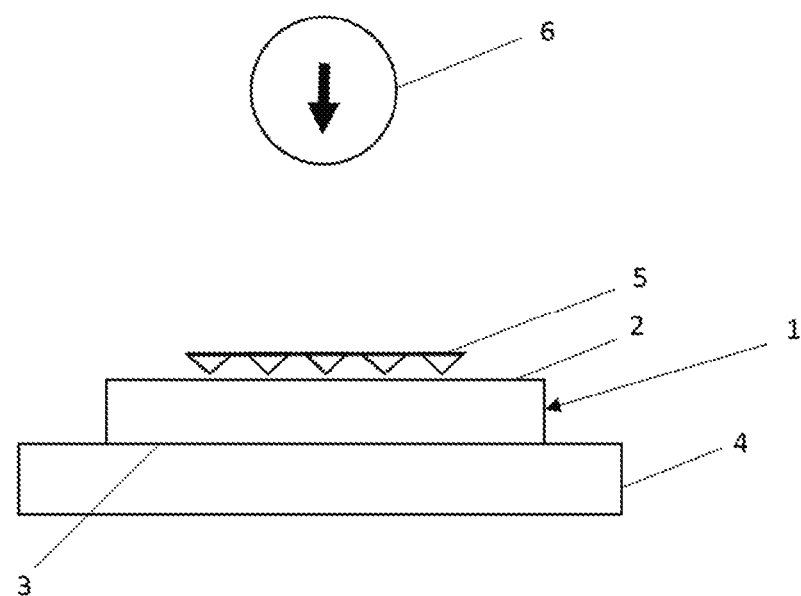
FIG. 1 is a simplified illustration of a sandpaper press test.

Glass article: The glass article can be of any size. For example it could be a long ultrathin glass ribbon that is rolled (glass roll), a large glass sheet, a smaller glass part cut out of a glass roll or out of a glass sheet or a single small glass article (like an FPS or display cover glass) etc.

Thickness (t): The thickness of a glass article is the arithmetic average of the thickness of the sample to be measured.

Compressive Stress (CS): The induced compression among glass network after ion-exchange on the surface layer of glass. Such compression could not be released by deformation of glass and sustained as stress. CS decreases from a maximum value at the surface of the glass article (surface CS) towards the inside of the glass article. Commercially available test machines such as FSM6000 (company "Luceo Co., Ltd.", Japan/Tokyo) could measure the CS by waveguide mechanism.

Depth of Layer (DoL): The thickness of ion-exchanged layer, a region where CS exists. Commercially available test machine such as FSM6000 (company "Luceo Co., Ltd.", Japan/Tokyo) could measure the DoL by wave guide mechanism.

Central Tension (CT): When CS is induced on one side or both sides of single glass sheet, to balance the stress according to the $3^{rd}$ principle of Newton's law, a tension stress must be induced in the center region of glass, and it is called central tension. CT could be calculated from measured CS and DoL.

Average roughness ($R_a$): A measure of the texture of a surface. It is quantified by the vertical deviations of a real surface from its ideal form. Commonly amplitude parameters characterize the surface based on the vertical deviations of the roughness profile from the mean line. $R_a$ is arithmetic average of the absolute values of these vertical deviations.

Breakage height: The breakage height is the height (given in mm) from which an object of a defined weight can fall onto a chemically toughened ultrathin glass article until the glass article breaks (that means: cracks are generated). The breakage height is determined by sandpaper ball drop test which is described in more detail further herein.

Breakage bending radius (BBR): The breakage bending radius (given in mm) is the minimum radius (r) of the arc at the bending position where a glass article reaches the maximum deflection before kinking or damaging or breaking. It is measured at the inside curvature at the bending position of a glass material. A smaller radius means greater flexibility and deflection of glass. The bending radius is a parameter depending on the glass thickness, the Young's modulus and the glass strength. Chemically toughened ultrathin glass has very small thickness, low Young's modulus and high strength. All the three factors contribute to low bending radius and better flexibility. The test for determining the BBR is described in more detail further herein.

Exemplary embodiments disclosed herein provide a chemically toughened glass article having a thickness (t) of less than 0.4 mm, a first surface and a second surface and a compressive stress region extending from the first surface to a first depth in the glass article (DoL), the region is defined by a compressive stress (CS). A surface CS at the first surface is at least 100 MPa. The first surface and the second surface are located on opposite sides of the glass article. The glass article has a breakage height (given in mm) of at least the figure of the thickness (tin mm) of the glass article multiplied by 50. The breakage height is determined in a sandpaper ball drop test. In this test, the glass article is placed with its second surface on a steel plate and the first surface of the glass article is loaded until breakage by a 4.5 g acrylic ball dropped from above. A sandpaper of type P180 is placed on the first surface of the glass article and the abrasive side of the sandpaper is in contact with the first surface. Further, the glass article provided according to the present invention has a breakage bending radius (given in mm) of less than the thickness (tin mm) of the glass article multiplied by 100000, the result bring divided by the figure of the surface compressive stress (in MPa) measured at the first surface.

Such a glass article provided according to the present invention has an optimized stress profile. It has the balance between small bending radius and high sharp contact resistance, especially impact resistance. Surprisingly it was found that the glass article will be reasonably strong enough to accommodate the applications of ultrathin glass articles, especially in daily use, if the following conditions are fulfilled:

a) The glass article has a breakage height (given in N) of ≥50*t in the previously mentioned sandpaper ball drop test (t being the figure of the respective thickness of the glass article in the unit "mm"); and b) its breakage bending radius (given in mm) is <100000*t/CS, wherein t is the thickness of the glass article (given in the unit "mm") and CS is the figure of the measured surface compressive stress (given in the unit "MPa"). That means in the latter calculation, the product is divided by a figure which corresponds to the respective measured surface compressive strength (given in MPa) at the first surface of the glass article.

By fusing these criteria it can be decided whether a strengthened ultrathin glass article is suitably strong and flexible enough to be used for the respective application before it becomes part of a product. It was surprisingly found that the breakage height is strongly related to glass thickness. Therefore, thinner glass is especially sensitive to breakage caused by impacts with hard and sharp objects.

Surprisingly it has been found that the breakage height criterion for an ultrathin glass can be described by the inventive factor 50 and the thickness of the glass article. The inventive factor will be valid if the breakage height of the glass article is determined in the sandpaper ball drop test. In this dynamic test, the glass article is placed with its second surface on a steel plate and the first surface of the glass article (which is chemically toughened) is orientated upwards. An acrylic ball having a weight of 4.5 g is dropped from above onto the glass article. Step by step the drop height of the ball is increased until the glass article breaks. There is one drop per each step and the distance between each step is chosen reasonably. The test is performed on small samples (11 mm×11 mm) at room temperature of about 20° C. and relative humidity of about 50% using sandpaper P180 according to ISO 6344 (e.g. #180 Buehler sandpaper manufactured by the company "Buehler"). If a glass article of larger size is to be tested, small samples will be cut out using a diamond cutting wheel. No further edge treatment is performed on the small samples. The breakage height (also called "sandpaper ball drop height") is the maximum height that can be applied when the glass article breaks. Breaking means that the glass article gets a visible surface crack (crack is generated) or breaks into two or several pieces. The breakage here is determined with the naked eye.

This test is adjusted to and is especially suitable for ultrathin glass articles and reproduces in a quite simple manner the previously mentioned problem, that is the impact contact between the glass article (e.g. a FPS or a touch display) and a sharp hard object when the glass article falls down or is hit.

Surprisingly, it was found that the breakage bending radius criterion for an ultrathin glass can be described by the inventive factor 100000, the thickness and measured surface CS of the glass article. The inventive factor will be valid if the breakage bending radius of the glass article is determined in a 2 point bending test as described now. The breakage bending radius is determined by using a UTM (universal testing machine) on small samples (20 mm×70 mm) at room temperature of about 20° C. and relative humidity of about 50%. If a glass article of larger size is to be tested, small samples will be cut out using a diamond cutting wheel. No further edge treatment is performed on the small samples. The glass article is brought into a bent position and its opposite ends are positioned between two parallel plates (steel plates). Then the distance between the plates is lowered continuously so that the bending radius of the glass article decreases until breakage wherein the loading speed is 60 mm/min. The distance between the plates is recorded when the ultrathin glass article is kinking or damaging or breaking into two or several piece which is determined by the signal of the UTM software. From that distance the corresponding bending radius of the glass article at the time of breakage is calculated. —If glass articles with treated edges are tested (the glass articles may be, for example, edge treated by CNC grinding, etched by acid (e.g. HCl, $HNO_3$, $H_2SO_4$, $NH_4HF_2$, or mixtures thereof) and then toughened), the bending radius will even be smaller compared to corresponding glass articles without treated edges because edge treatment increases the strength and thus decreases the bending radius.

This 2 point bending test is adjusted to and is especially suitable for ultrathin glass articles and reproduces in a quite simple manner the previously mentioned problem, that is the bending of a glass article (e.g. a FPS or a touch display) upon loading it. In this context of the present invention it was found out that the 2 point bending method is more meaningful than other known bending strength tests such as 3 and 4 point bending tests.

In some embodiments provided according to the present invention, the breakage bending radius (in mm) of the chemically toughened glass article is less than the thickness (t in mm) of the glass article multiplied by 80000 wherein the result is divided by the figure of the surface compressive stress (in MPa) measured at the first surface (<t*80000/CS). The breakage bending radius (in mm) can be less than the thickness (t in mm) of the glass article multiplied by 70000 wherein the result is divided by the figure of the surface compressive stress (in MPa) measured at the first surface (<t*70000/CS). In some embodiments, the breakage bending radius (in mm) can be less than the thickness (t in mm) of the glass article multiplied by 60000 wherein the result is divided by the figure of the surface compressive stress (in MPa) measured at the first surface (<t*60000/CS).

As described previously, ultrathin glass articles are used in many fields of daily applications, e.g. as cover for fingerprint sensors especially in smartphones and tablets. To increase the strength of the cover glass toughening, such as chemically toughening, is performed. In this context, in the prior art it was generally assumed that a high compressive strength and a high DoL is necessary to ensure the flexibility and strength of the ultrathin glass. Thus such a known toughened glass article usually has a high compressive stress (CS) and a DoL of >20 µm, which leads to a high central tension (CT) in the inner part of the glass. However, it was surprisingly found that the sharp contact resistance of such known toughened glasses decreases quickly with increasing DoL and reaches a minimum value when the ratio between DoL (given in µm) and thickness (given in µm) is roughly between 0.1 to 0.2, if there is no additional surface protection against sharp contact. Thus, if such a known toughened glass article is pressed or impacted by objects with high hardness (e.g. sand grains sticking to the finger while pressing the cover glass of a FPS) a crack will result that extends through the strengthened layer of the cover glass (that is defined by a compressive stress (CS)) and reaches the tensile part of the glass even if the contact force has been quite low. Due to the high central tensile stress existing in that glass region the known glass article cracks spontaneously and the cover glass is damaged.

Surprisingly, it was found that the glass articles provided according to the present invention are more reliable concerning flexibility and impact resistance in the further processing and daily use. The reason for that is the improved and optimized stress profile of the glass articles provided according to the present invention. The other way round, if an ultrathin glass article meets the disclosed breakage height and the disclosed breakage bending radius (referred to its respective thickness and measured surface CS), the breakage risk of the glass article when being used (e.g. as cover glass for example of a finger print sensor) is low.

As mentioned previously, a chemically toughened glass article provided according to the present invention can have quite different sizes. Therefore, in the course of determining the breakage height and breakage bending radius the following has to be taken into account:

In the case of larger glass articles (e.g. a glass roll or a large glass sheet), a plurality of samples are measured regarding breakage height using the sandpaper ball drop test. For this, a random sample N values is taken. N should be high enough to obtain a statistically ensured average value. At least 20, such as at least 30 samples, may be tested. The number of samples depends on the respective size of the glass article to be tested. The measured values are statistically evaluated using Weibull method. B10 value of Weibull distribution (that is the calculated height (in mm) wherein 10% of the samples are broken) is determined and taken to represent the disclosed breakage height.

However, in the case of small glass articles (e.g. an individual small cover glass) a single measured value of breakage height is sufficient and is taken to represent disclosed breakage height.

In the case of a number of measured values between 2 and 19, the average of measured breaking height is taken to represent the disclosed breakage height.

For the breakage bending radius an average value can be calculated. For this a random sample of N values is taken. The number of samples depends on the respective size of the glass article to be evaluated. In some embodiments, N should be high enough to obtain a statistically ensured average value. At least 20, such as at least 30, samples may be tested. Thus, a random sample of N values is taken for the breakage bending radii $R_1 \ldots R_N$, and, for the values of these random samples, the average value $$\langle R \rangle = \frac{1}{N} \sum_{i=1}^{N} R_i \text{ and the variance}$$

$$s = \sqrt{\frac{1}{N-1} \sum_{i=1}^{N} (R_i - \langle R \rangle)^2} \text{ are calculated.}$$

The average breakage bending radius is taken to represent disclosed breakage bending radius. However, in the case of small glass articles (e.g. an individual small cover glass) a single measured value of breakage bending radius is sufficient and is taken to represent disclosed breakage bending radius.

Average value and variance of the breakage height are calculated accordingly.

In some embodiments, the glass is an alkali-containing glass, such as alkali aluminosilicate glass, alkali silicate glass, alkali borosilicate glass, alkali aluminoborosilicate glass, alkali boron glass, alkali germinate glass, alkali borogermanate glass, alkali soda lime glass, and combinations thereof.

The ultrathin glass article provided according to the present invention has a thickness of less than or equal to 400 µm, such as less than or equal to 330 µm, less than or equal to 250 µm, less than or equal to 210 µm, less than or equal to 180 µm, less than or equal to 150 µm, less than or equal to 130 µm, less than or equal to 100 µm, less than or equal to 80 µm, less than or equal to 70 µm, less than or equal to 50 µm, less than or equal to 30 µm, or less than or equal to 10 µm. The thickness can be at least 5 µm. Such particularly thin glass articles are desired for various applications as described previously. In particular, the thin thickness grants the glass flexibility.

According to some embodiments, the glass article can be a flat article and/or flexible article and/or deformable article. A "flat" article can, for example, be an essentially plane or planar glass article. However, "flat" in the sense of the present inventions also includes articles deformable or deformed in two or three dimensions.

To reach good chemical toughening performance, the glass should contain a fair amount of alkaline metal ions, such as $Na_2O$, furthermore, adding less $K_2O$ to the glass composition can also improve chemical toughening rate. Furthermore, it is found that adding $Al_2O_3$ to the glass composition can significantly improve the toughening performance of the glass.

$SiO_2$ is the major glass network former in the glasses provided according to the present invention. Additionally, also $Al_2O_3$, $B_2O_3$ and $P_2O_5$ may be used as glass network formers. The content of the sum of $SiO_2$, $B_2O_3$ and $P_2O_5$ should not be less than 40% for common production methods. Otherwise, the glass sheet may be difficult to form and could become brittle and lose transparency. A high $SiO_2$ content will require high melting and working temperature of glass production, usually it should be less than 90%. In some embodiments, the content of $SiO_2$ in the glass is between 40 and 75 wt.-%, such as between 50 and 70 wt.-% or between 55 and 68 wt.-%. In some embodiments, the content of $SiO_2$ in the glass is between 55 and 69 wt.-%, such as between 57 and 66 wt.-% or between 57 and 63 wt.-%. In some embodiments, the content of $SiO_2$ in the glass is between 60 and 85 wt.-%, such as between 63 and 84 wt.-% or between 63 and 83 wt.-%. In some embodiments, the content of $SiO_2$ in the glass is between 40 and 81 wt.-%, such as between 50 and 81 wt.-% or between 55 and 76 wt.-%. Adding the $B_2O_3$ and $P_2O_5$ to $SiO_2$ could modify the network property and reduce the melting and working temperature of glass. Also, the glass network former has big influence on the CTE of glass.

In addition, the $B_2O_3$ in the glass network forms two different polyhedron structures which are more adaptable to loading force from outside. Addition of $B_2O_3$ can usually result in lower thermal expansion and lower Young's modulus which in turn leads to good thermal shock resistance and slower chemical toughening speed through which low CS and low DoL could be easily obtained. Therefore, the addition of $B_2O_3$ to ultrathin glass could greatly improve the chemical toughening processing window and ultrathin glass and widen the practical application of chemically toughened ultrathin glass. In some embodiments, the amount of $B_2O_3$ in the glass provided according to the present invention is between 0 and 20 wt.-%, such as between 0 and 18 wt.-% or between 0 and 15 wt.-%. In some embodiments, the amount of $B_2O_3$ can be between 0 and 5 wt.-%, such as between 0 and 2 wt.-%. In some embodiments, the amount of $B_2O_3$ can be between 5 and 20 wt. %, such as between 5 and 18 wt.-%. If the amount of $B_2O_3$ is too high, the melting point of the glass may be too high. Moreover, the chemical toughening performance is reduced when the amount of $B_2O_3$ is too high. $B_2O_3$ free variants can also be used.

$Al_2O_3$ works both as glass network former and glass network modifier. The $[AlO_4]$ tetrahedral and $[AlO_6]$ hexahedral will be formed in the glass network depending on the amount of $Al_2O_3$, and they could adjust the ion-exchanging speed by changing the size of space for ion-exchange inside glass network. Generally, the content of this component varies depending on the respective glass type. Therefore, some glasses provided according to the present invention comprise $Al_2O_3$ in an amount of at least 2 wt.-%, such as in an amount of at least 10 wt.-% or at least 15 wt.-%. However, if the content of $Al_2O_3$ is too high, the melting temperature and working temperature of glass will also be very high and the crystalline will easily formed to make glass lose transparency and flexibility. Therefore, some glasses provided according to the present invention comprise $Al_2O_3$ in an amount of at most 30 wt.-%, such as at most 27 wt.-% or at most 25 wt.-%. Some embodiments can comprise $Al_2O_3$ in an amount of at most 20 wt.-%, such as of at most 15 wt.-% or of at most 10 wt.-%, or at most 8 wt. %, at most 7 wt. %, at most 6 wt. %, or at most 5 wt. %. Some glass variants can be free of $Al_2O_3$. Other glass variants can comprise at least 15 wt. %, such as at least 18 wt. % $Al_2O_3$ and/or at most 25 wt. %, such as at most 23 wt. % or at most 22 wt. % $Al_2O_3$.

Alkaline oxides like $K_2O$, $Na_2O$ and $Li_2O$ work as the glass work modifier. They can break glass network and form non-bridge oxide inside glass network. Adding alkaline could reduce the working temperature of glass and increase CTE of glass. Sodium and lithium content is important for ultrathin flexible glass which is chemically toughenable, for $Na^+/Li^+$, $Na^+/K^+$, $Li^+/K^+$ ion exchange is a necessary step for the toughening, the glass will not be toughened if it does not contain alkaline itself. However, sodium may be used over lithium because lithium may significantly reduce the diffusivity of the glass. Therefore, some glasses provided according to the present invention comprise $Li_2O$ in an amount of at most 5 wt. %, such as at most 4 wt. %, at most 2 wt. %, at most 1 wt. %, or at most 0.1 wt. %. Some embodiments are even free of $Li_2O$. Depending on the glass type a lower limit for $Li_2O$ can be 3 wt. %, such as 3.5 wt. %.

The glasses provided according to the present invention may comprise $Na_2O$ in an amount of at least 4 wt. %, such as at least 5 wt. %, at least 6 wt. %, at least 8 wt. %, or at least 10 wt. %. Sodium is very important for the chemical toughening performance as the chemical toughening may comprise the ion exchange of sodium in the glass with potassium in the chemical toughening medium. However, the content of sodium should also not be too high because the glass network may be severely deteriorated and glass may be extremely hard to be formed. Another important factor is that ultrathin glass should have low CTE, to meet such requirement glass should not contain too much $Na_2O$. Therefore, the glasses may comprise $Na_2O$ in an amount of at most 30 wt. %, such as at most 28 wt. %, at most 27 wt. %, at most 25 wt. %, or at most 20 wt. %.

The glasses provided according to the present invention may comprise $K_2O$. However, as the glasses may be chemically toughened by exchanging sodium ions in the glass with potassium ions in the chemical toughening medium, a too high amount of $K_2O$ in the glass will compromise the chemical toughening performance. Therefore, the glasses provided according to the present invention may comprise $K_2O$ in an amount of at most 10 wt. %, such as at most 8 wt. %. Some exemplary embodiments comprise at most 7 wt. %, at most 4 wt. %, at most 2 wt. %, at most 1 wt. %, or at most 0.1 wt. %. Some embodiments are even free of $K_2O$.

But the total amount of alkaline content should, in some embodiments, not be higher than 35 wt.-%, such as not higher than 30 wt. %, not higher than 28 wt. %, not higher than 27 wt. %, or not higher than 25 wt. %, for the glass network may be severely deteriorated and glass may be extremely hard to be formed. Some variants comprise an alkaline content of at most 16 wt.-%, such as of at most 14 wt.-%. Another important factor is that ultrathin glass should have low CTE, to meet such requirement glass should not contain too much alkali elements. However, as described previously, the glasses should contain alkali elements in order to facilitate chemical toughening. Therefore, the glasses provided according to the present invention may comprise alkali metal oxides in an amount of at least 2 wt. %, such as at least 3 wt. %, at least 4 wt. %, at least 5 wt. %, or at least 6 wt. %.

Alkaline earth oxides such as MgO, CaO, SrO, BaO work as the network modifier and decrease forming temperature of glass. These oxides can be added to adjust the CTE and Young's modulus of glass. Alkaline earth oxides have very important function that they can change refractive index of glass to meet special requirements. For example, MgO could decrease the refractive index of glass and BaO could increase the refractive index. The weight content of alkaline earth oxides is, in some embodiments, not higher than 40 wt. %, such as not higher than 30 wt.-%, not higher than 25 wt.-%, not higher than 20 wt.-%, not higher than 15 wt.-%, not higher than 13 wt.-%, or not higher than 12 wt.-%. Some variants of glasses can comprise alkaline earth oxides of at most 10 wt.-%, such as of at most 5 wt.-% or of at most 4 wt.-%. If the amount of alkaline earth oxides is too high, chemical toughening performance may be deteriorated. A lower limit for alkaline earth oxides can be 1 wt. %, or 5 wt. %. Moreover, the crystallization tendency may be increased if the amount of alkaline earth oxides is too high. Some variants can be free of alkaline earth oxides.

Some transition metal oxides in glass, such as ZnO and $ZrO_2$, have similar function as alkaline earth oxides and may be included in some embodiments. Other transition metal oxides, such as $Nd_2O_3$, $Fe_2O_3$, CoO, NiO, $V_2O_5$, $MnO_2$, $TiO_2$, CuO, $CeO_2$, and $Cr_2O_3$, work as coloring agent to make glass with specific optical or photonic functions, for example, color filter or light convertor. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The exemplary compositions described further herein refer to different glass types before toughening.

In some embodiments, the ultrathin flexible glass is an alkali metal aluminosilicate glass comprising the following components in the indicated amounts (in wt. %):

| Component | (wt. %) |
|---|---|
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The alkali metal aluminosilicate glass provided according to the present invention may comprise the following components in the indicated amounts (in wt. %):

| Component | (wt. %) |
|---|---|
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In some embodiments, the alkali metal aluminosilicate glass provided according to the present invention comprises the following components in the indicated amounts (in wt. %):

| Components | (wt. %) |
|---|---|
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In some embodiments, the ultrathin flexible glass is soda lime glass comprising the following components in the indicated amounts (in wt. %):

| Component | (wt. %) |
|---|---|
| $SiO_2$ | 40-81 |
| $Al_2O_3$ | 0-10 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass provided according to the present invention may comprise the following components in the indicated amounts (in wt. %):

| Component | (wt. %) |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass provided according to the present invention may comprise the following components in the indicated amounts (in wt. %):

| Component | (wt. %) |
| --- | --- |
| $SiO_2$ | 50-81 |
| $Al_2O_3$ | 0-8 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass provided according to the present invention may comprise the following components in the indicated amounts (in wt. %):

| Component | (wt. %) |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In some embodiments, the soda lime glass provided according to the present invention comprises the following components in the indicated amounts (in wt. %):

| Component | (wt. %) |
| --- | --- |
| $SiO_2$ | 55-76 |
| $Al_2O_3$ | 0-6 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In some embodiments, the soda lime glass provided according to the present invention comprises the following components in the indicated amounts (in wt. %):

| Component | (wt. %) |
| --- | --- |
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In some embodiments, the ultrathin flexible glass is lithium aluminosilicate glass comprising the following components in the indicated amounts (in wt. %):

| Component | (wt.-%) |
| --- | --- |
| $SiO_2$ | 55-69 |
| $Al_2O_3$ | 15-25 |
| $Li_2O$ | 3-5 |
| $Na_2O + K_2O$ | 0-30 |
| $MgO + CaO + SrO + BaO$ | 0-5 |
| ZnO | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The lithium aluminosilicate glass provided according to the present invention may comprise the following components in the indicated amounts (in wt. %):

| Component | (wt.-%) |
| --- | --- |
| $SiO_2$ | 57-66 |
| $Al_2O_3$ | 15-23 |
| $Li_2O$ | 3-5 |

-continued

| Component | (wt.-%) |
|---|---|
| $Na_2O + K_2O$ | 3-25 |
| $MgO + CaO + SrO + BaO$ | 1-4 |
| $ZnO$ | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In some embodiments, the lithium aluminosilicate glass provided according to the present invention comprises the following components in the indicated amounts (in wt. %):

| Component | (wt.-%) |
|---|---|
| $SiO_2$ | 57-63 |
| $Al_2O_3$ | 15-22 |
| $Li_2O$ | 3.5-5 |
| $Na_2O + K_2O$ | 5-20 |
| $MgO + CaO + SrO + BaO$ | 0-5 |
| $ZnO$ | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In some embodiments, the ultrathin flexible glass is borosilicate glass comprising the following components in the indicated amounts (in wt. %):

| Composition | (wt.-%) |
|---|---|
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The borosilicate glass provided according to the present invention may comprise the following components in the indicated amounts (in wt. %):

| Compositon | (wt.-%) |
|---|---|
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The borosilicate glass provided according to the present invention may comprise the following components in the indicated amounts (in wt. %):

| Compositon | (wt.-%) |
|---|---|
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The ultrathin glass provided according to the present invention could be produced by polishing down or etching from thicker glass. However, these two methods are not economical and lead to bad surface quality which is quantified by $R_a$ roughness for example.

Direct hot-forming production like down draw, overflow fusion method are suitable for the mass production. A redraw method is also advantageous. These mentioned methods are economical and the glass surface quality is high and the ultrathin glass with thickness from 5 μm (or even less) to 500 μm could be produced. For example, the down-draw/overflow fusion method could make pristine or fire-polished surface with roughness $R_a$ less than 5 nm, such as less than 2 nm or less than 1 nm. The thickness could also be precisely controlled ranging from 5 μm and 500 μm. The thin thickness grants the glass flexibility. Special float could produce ultrathin glass with pristine surface, it is economical and suitable for mass production too, but the glass produced by float has one side as tin-side which is different from the other side. The difference between two sides would cause warp issue of glass after chemical toughening, and affect printing or coating process because two sides have different surface energy. Another variant of UTG can be produced by sawing a ultrathin glass articles out of a thick glass ingot, bar, block etc.

The strengthening, also called toughening, can be done by immersing glass into a melted salt bath with potassium ions or by covering the glass with potassium ions or other alkaline metal ions contained in a paste and heated at high temperature for a certain time. The alkaline metal ions with larger ion radius in the salt bath (or the paste) exchange with alkaline metal ions with smaller radius in the glass article, and surface compressive stress is formed due to ion exchange.

A chemically toughened glass article provided according to the present invention is obtained by chemically toughening a chemically toughenable glass article. The toughening process could be done by immersing the ultrathin glass article into a salt bath which contains monovalent ions to exchange with alkali ions inside glass. The monovalent ions in the salt bath has radius larger than alkali ions inside glass. A compressive stress to the glass is built up after ion-exchange due to larger ions squeezing in the glass network. After the ion-exchange, the strength and flexibility of ultrathin glass are surprisingly and significantly improved. In addition, the CS induced by chemical toughening improves the bending properties of the toughened glass article and could increase scratch resistance of glass.

The most used salt for chemical toughening is $Na^+$-containing or $K^+$-containing melted salt or a mixture of them. The commonly used salts are $NaNO_3$, $KNO_3$, $NaCl$, $KCl$, $K_2SO_4$, $Na_2SO_4$, $Na_2CO_3$, and $K_2CO_3$. Additives like NaOH, KOH and other sodium salt or potassium salt could be also used for better controlling the speed of ion-exchange, CS and DoL during chemical toughening. $Ag^+$-containing or $Cu^{2+}$-containing salt bath could be used to add anti-microbial function to ultrathin glass.

The chemical toughening is not limited to single step. It can include multi steps in a salt bath with alkaline metal ions of various concentrations to reach better toughening performance. Thus, the chemically toughened glass article provided according to the present invention can be toughened in one step or in the course of several steps, e.g. two steps.

The chemically toughened glass article provided according to the present invention can have just one surface (first surface) where a compressive stress region extending from the first surface to a first depth in the glass article exists. The region is defined by a compressive stress. In this case the glass article comprises only one toughened side. In some embodiments, the glass article provided according to the present invention also comprises a second compressive stress region extending from the second surface to a second depth in the glass article (DoL), the region is defined by a compressive stress and the surface compressive stress (CS) at the second surface is at least 100 MPa. The second surface is located opposite to the first surface. Thus this exemplary glass article is toughened on both sides.

Compressive stress (CS) mostly depends on the composition of glass. Higher content $Al_2O_3$ can be helpful to achieve higher compressive stress. To reach balanced glass hot-forming capability and chemical toughening performance, the surface compressive stress may be below 1200 MPa. After toughening, the ultrathin glass should have high enough compressive stress to achieve high strength. Therefore, in some embodiments, surface compressive stress at the first surface and/or at the second surface is equal to or more than 100 MPa, such as equal to or more than 200 MPa, equal to or more than 300 MPa, equal to or more than 400 MPa, or equal to or more than 500 MPa. In some embodiments, surface compressive stress is equal to or more than 600 MPa, such as equal to or more than 700 MPa or equal to or more than 800 MPa. Of course the CS at the first surface and the CS at the second surface can be essentially the same or can be different.

Generally, DoL depends on glass composition, but it can increase nearly infinitely with increased toughening time and toughening temperature. A defined DoL is essential to ensure the stable strength of toughened glass, but too high DoL increases the self-breakage ratio and the strength performance when the ultrathin glass article is under compressive stress.

So according to an exemplary embodiment provided according to the present invention, DoL should be controlled to be quite low (low DoL variant). To achieve the defined low DoL the toughening temperature and/or the toughening time is/are reduced. According to the present invention, a lower toughening temperature may be used as DoL is more sensitive to the temperature and a longer toughening time is easily set during mass production. However, a reduced toughening time is also possible in order to decrease DoL of the glass article.

It has been found that it can be advantageous for the stress profile of the ultrathin glass article provided according to the present invention if the glass article has a DoL (in μm) in a range of 0.5 μm to 120*t/CS μm (t given in μm, CS=figure of surface compressive stress (given in MPa)) measured at the first surface). The glass article may have a DoL (in μm) in a range of 0.5 μm to 90*t/CS μm, such as 1 μm to 90*t/CS μm (t given in μm, CS=figure of surface compressive stress (given in MPa) measured at the first surface)), and/or a DoL (in μm) in a range of 0.5 μm to 60*t/CS μm, such as 1 μm to 60*t/CS μm (t given in μm, CS=figure of surface compressive stress (given in MPa)) measured at the first surface). Some embodiments may have a DoL (in μm) in a range of 0.5 μm to 45*t/CS μm, such as 1 μm to 45*t/CS μm (t given in μm, CS=figure of surface compressive stress (given in MPa) measured at the first surface)). Other exemplary embodiments may have a DoL (in μm) in a range of 0.5 μm to 27*t/CS μm, such as 1 μm to 27*t/CS μm (t given in μm, CS=figure of surface compressive stress (given in MPa) measured at the first surface)). In the previously given calculations "x*t/CS" means that x is multiplied by the thickness of the glass article and divided by the figure of the measured surface CS wherein x can be 120, 90, 60, 45, 27.

The advantageous value of DoL depends in each case on the glass composition, the thickness and applied CS of the respective glass article. In general, glass articles provided according to the previously mentioned embodiments have a quite low DoL. By decreasing the DoL, the CT decreases. If high press force is applied on such embodiments by sharp objects, the caused defects will just be on the glass surface. Since the CT is reduced significantly the caused defect is not able to overcome the internal strength of the glass article, and thus the glass article does not break into two or several pieces. Such a glass article with low DoL has an improved sharp press resistance.

According to some exemplary embodiments provided according to the present invention, the DoL of the glass article can be quite high (high DoL variant). The glass article may have a DoL (in μm) in a range of 27*t/CS μm to 0.5*t μm (t given in μm, CS=figure of surface compressive stress (given in MPa) measured at the first surface), such as a DoL (in μm) in a range of 45*t/CS μm to 0.45*t μm (t given in μm, CS=figure of surface compressive stress (given in MPa) measured at the first surface), and/or a DoL (in μm) in a range of 60*t/CS μm to 0.4*t μm (t given in μm, CS=figure of surface compressive stress (given in MPa) measured at the first surface), such as a DoL (in μm) in a range of 90*t/CS μm to 0.35*t μm (t given in μm, CS=figure of surface compressive stress (given in MPa) measured at the first surface). In the previously given calculations "y*t/CS" means that y is multiplied by the thickness of the glass article and divided by the figure of the measured surface CS wherein y can be 27, 45, 60, 90. "z*t" means that z is multiplied by the thickness of the glass article wherein z can be 0.5, 0.45, 0.4, 0.35. In order to achieve a balanced stress profile such glass articles may comprise a coated and/or laminated layer. The coated layer and/or laminated layer can resist defects of scratches induced on the glass surface by sharp objects even if the DoL of the glass article is quite high. Thus it has been found that, alternatively to lowering DoL, depositing a coating and/or laminating a polymer layer on one or both surfaces of the glass article can be applied in order to increase the sharp contact resistance. Of course a glass article having a low DoL can comprise a coated layer and/or laminated layer too. The laminated polymer layer and/or the coated layer can cover the surface of the glass article completely or partly.

According to some embodiments, the toughened glass article comprises a laminated polymer layer wherein the polymer layer has a thickness of at least 1 µm, such as of at least 5 µm, of at least 10 µm, of at least 20 µm, or of at least 40 µm to reach the improved sharp contact resistance. An upper limit for the thickness of polymer layer could be 200 µm. Lamination can be performed by different known methods.

In the case of lamination, the polymer material can be selected, for example, from the group consisting of a silicone polymer, a sol-gel polymer, polycarbonate (PC), polyethersulphone, polyacrylate, polyimide (PI), an inorganic silica/polymer hybrid, a cycloolefin copolymer, a polyolefin, a silicone resin, polyethylene (PE), polypropylene, polypropylenepolyvinyl chloride, polystyrene, styreneacrylonitrile copolymer, thermoplastic polyurethane resin (TPU), polymethyl methacrylate (PMMA), ethylene-vinyl acetate copolymer, polyethylene terephthalate (PET), polybutylene terephthalate, polyamide (PA), polyacetal, polyphenyleneoxide, polyphenylenesulfide, fluorinated polymer, a chlorinated polymer, ethylene-tetrafluoroethylene (ETFE), polytetrafluoroethylene (PTFE), polyvinyl chloride (PVC), polyvinylidene chloride (PVDC), polyvinylidene fluoride (PVDF), polyethylene naphthalate (PEN), a terpolymer made of tetrafluroethylene, a terpolymer made of hexafluoropropylene, and a terpolymer made of vinylidene fluoride (THV) or polyurethane, or mixtures thereof. The polymer layer can be applied onto the ultrathin chemically toughened glass article by any known method.

According to some embodiments, the toughened glass article comprises at least at one surface of a coated layer comprising a coating material. The coating of a protective layer can be applied by any known coating method such as chemical vapor deposition method (CVD), dip-coating, spin-coating, ink-jet, casting, screen printing, painting and spaying. However, the present invention is not limited to those procedures. Suitable coating materials are also known in the art. For example, they can comprise a duroplastic reaction resin that is a polymer selected from the group consisting of phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, silicone resins, cross-linking polyurethane resins, polymethacrylate reaction resins, and polyacrylate reaction resins.

According to some embodiments, the toughened glass article has a CT of less than or equal to 200 MPa, such as less than or equal to 150 MPa, less than or equal to 120 MPa, or less than or equal to 100 MPa. Some exemplary embodiments can have a CT of less than or equal to 65 MPa. Other exemplary embodiments can have a CT of less than or equal to 45 MPa. Some embodiments may even have a CT of less than or equal to 25 MPa. These CT values are especially advantageous for glass articles belonging to the low DoL variant.

Because of the low DoL those glass articles have a decreased internal CT. Decreased CT highly influences the sharp impact resistance of the toughened glass article. Even if sharp and hard objects damage the toughened surface of a glass article having a quite low CT, the article does not break as the internal strength of the glass structure cannot be overcome by the low CT.

Alternatively, it may be advantageous for glass articles belonging to the high DoL variant if they have a central tensile stress (CT) of more than or equal to 27 MPa, such as more than or equal to 45 MPa, more than or equal to 65 MPa, or more than or equal to 100 MPa.

The glass articles can be additionally coated for e.g. anti-reflection, anti-scratch, anti-fingerprint, anti-microbial, anti-glare and combinations of these functions.

As mentioned previously, CS, DoL and CT depends on the glass composition (glass type), glass thickness and toughening conditions.

It has been found that in the case of UTG aluminosilicate glasses the following features are advantageous:

A chemically toughened glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 450 MPa, wherein the glass article has a breakage height (given in mm) of at least the figure of the thickness (t in mm) of the glass article multiplied by 50, wherein the breakage height is determined in a sandpaper ball drop test in which the glass article is placed with its second surface on a steel plate and the first surface of the glass article is loaded until breakage by a 4.5 g acrylic ball dropped from above wherein a sandpaper of type P180 is placed on the first surface of the glass article, wherein the abrasive side of the sandpaper is in contact with the first surface, and the glass article has a breakage bending radius (given in mm) of <100000*t/CS, such as <80000*t/CS, <70000*t/CS, or <60000*T/CS, wherein the thickness t is given in mm and CS is the figure of surface compressive stress (given in MPa) measured at the first surface.

In some embodiments, the chemically toughened glass article has a DoL (in µm) in a range of 0.5 µm to 120*t/CS µm, such as a DoL in a range of 1 µm to 90*t/CS µm, a DoL in a range of 1 µm to 60*t/CS µm, a DoL in a range of 1 µm to 45*t/CS µm, or a DoL in a range of 1 µm to 27*t/CS µm, wherein t is given in µm and CS is the figure of surface compressive stress (given in MPa) measured at the first surface. CT can be less than or equal to 200 MPa, such as less than or equal to 150 MPa, less than or equal to 120 MPa, less than or equal to 100 MPa, less than or equal to 65 MPa, or less than or equal to 45 MPa.

Alternatively the chemically toughened glass article can have a DoL (in µm) in the range of 27*t/CS µm to 0.5*t µm, such as in the range of 45*t/CS µm to 0.45*t µm, in the range of 60*t/CS µm to 0.4*t µm, or in the range of 90*t/CS µm to 0.35*t µm, wherein t is given in µm and CS is the figure of surface compressive stress (given in MPa) measured at the first surface. In these embodiments CT can be more than or equal to 27 MPa, such as more than or equal to 45 MPa, or more than or equal to 65 MPa.

In some embodiments, in aluminosilicate glasses the surface CS at the first surface and/or at the second surface of the glass article can be equal to or more than 450 MPa, such as equal to or more than 500 MPa, equal to or more than 550 MPa, or equal to or more than 600 MPa. In some embodiments, the surface CS can be equal to or more than 700 MPa, such as equal to or more than 800 MPa.

In the case of UTG lithium aluminosilicate glasses the following features are advantageous:

A chemically toughened glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 350 MPa, wherein
- the glass article has a breakage height (given in mm) of at least the figure of the thickness (t in mm) of the glass article multiplied by 50, wherein the breakage height is determined in a sandpaper ball drop test in which the glass article is placed with its second surface on a steel plate and the first surface of the glass article is loaded until breakage by a 4.5 g acrylic ball dropped from above wherein a sandpaper of type P180 is placed on the first surface of the glass article, wherein the abrasive side of the sandpaper is in contact with the first surface, and
- the glass article has a breakage bending radius (given in mm) of <100000*t/CS, such as <80000*t/CS, <70000*t/CS, or <60000*T/CS, wherein the thickness t is given in mm and CS is the figure of surface compressive stress (given in MPa) measured at the first surface.

In some embodiments, the chemically toughened glass article has a DoL (in µm) in a range of 0.5 µm to 120*t/CS µm, such as a DoL in a range of 1 µm to 90*t/CS µm, a DoL in a range of 1 µm to 60*t/CS µm, a DoL in a range of 1 µm to 45*t/CS µm, or a DoL in a range of 1 µm to 27*t/CS µm, wherein t is given in µm and CS is the figure of surface compressive stress (given in MPa) measured at the first surface. CT can be less than or equal to 150 MPa, such as less than or equal to 100 MPa, less than or equal to 65 MPa, or less than or equal to 45 MPa.

Alternatively the chemically toughened glass article can have a DoL (in µm) in the range of 27*t/CS µm to 0.5*t µm, such as in the range of 45*t/CS µm to 0.45*t µm, in the range of 60*t/CS µm to 0.4*t µm, or in the range of 90*t/CS µm to 0.35*t µm, wherein t is given in µm and CS is the figure of surface compressive stress (given in MPa) measured at the first surface. The CT of these embodiments can be more than or equal to 27 MPa, such as more than or equal to 45 MPa, more than or equal to 65 MPa, or more than or equal to 100 MPa. In some embodiments, the surface CS of lithium aluminosilicate glasses at the first surface and/or at the second surface of the glass article can be equal to or more than 350 MPa, equal to or more than 500 MPa, equal to or more than 600 MPa, equal to or more than 700 MPa, or equal to or more than 800 MPa.

In the case of UTG borosilicate glasses the following features are advantageous:

A chemically toughened glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 100 MPa, wherein
- the glass article has a breakage height (given in mm) of at least the figure of the thickness (t in mm) of the glass article multiplied by 50, wherein the breakage height is determined in a sandpaper ball drop test in which the glass article is placed with its second surface on a steel plate and the first surface of the glass article is loaded until breakage by a 4.5 g acrylic ball dropped from above wherein a sandpaper of type P180 is placed on the first surface of the glass article, wherein the abrasive side of the sandpaper is in contact with the first surface, and
- the glass article has a breakage bending radius (given in mm) of <100000*t/CS, such as <80000*t/CS, <70000*t/CS, or <60000*t/CS, wherein the thickness t is given in mm and CS is the figure of surface compressive stress (given in MPa) measured at the first surface.

In some embodiments, the chemically toughened glass article has a DoL (in µm) in a range of 0.5 µm to 60*t/CS µm, such as a DoL in a range of 1 µm to 45*t/CS µm, or a DoL in a range of 1 µm to 27*t/CS µm, wherein t is given in µm and CS is the figure of surface compressive stress (given in MPa) measured at the first surface. CT can be less than or equal to 150 MPa, such as less than or equal to 120 MPa, less than or equal to 100 MPa, less than or equal to 65 MPa, less than or equal to 45 MPa, or less than or equal to 25 MPa.

Alternatively the chemically toughened glass article can have a DoL (in µm) in the range of 27*t/CS µm to 0.5*t µm, such as in the range of 45*t/CS µm to 0.45*t µm, wherein t is given in µm and CS is the figure of surface compressive stress (given in MPa) measured at the first surface. The CT in that alternative can be more than or equal to 27 MPa, more than or equal to 45 MPa, or more than or equal to 65 MPa.

In some embodiments, the surface CS at the first surface and/or at the second surface of borosilicate glasses can be equal to or more than 100 MPa, such as equal to or more than 200 MPa, or equal to or more than 300 MPa.

In the case of UTG soda lime glasses the following features are advantageous:

A chemically toughened glass article having a thickness (t) of less than 0.4 mm, a first surface and a second surface and a compressive stress region extending from the first surface to a first depth in the glass article (DoL), the region is defined by a compressive stress (CS) wherein a surface CS at the first surface is at least 200 MPa at the first surface, wherein
- the glass article has a breakage height (given in mm) of at least the figure of the thickness (t in mm) of the glass article multiplied by 50, wherein the breakage height is determined in a sandpaper ball drop test in which the glass article is placed with its second surface on a steel plate and the first surface of the glass article is loaded until breakage by a 4.5 g acrylic ball dropped from above wherein a sandpaper of type P180 is placed on the first surface of the glass article, wherein the abrasive side of the sandpaper is in contact with the first surface, and
- the glass article has a breakage bending radius (given in mm) of <100000*t/CS, such as <80000*t/CS, <70000*t/CS, or <60000*T/CS, wherein the thickness t is given in mm and CS is the figure of surface compressive stress (given in MPa) measured at the first surface.

In some embodiments, the chemically toughened glass article has a DoL (in µm) in a range of 0.5 µm to 90*t/CS µm, such as a DoL in a range of 0.5 µm to 60*t/CS µm, a DoL in a range of 1 µm to 45*t/CS µm, or a DoL in a range of 1 µm to 27*t/CS µm, wherein t is given in µm and CS is the figure of surface compressive stress (given in MPa) measured at the first surface. CT can be less than or equal to 150 MPa, less than or equal to 100 MPa, less than or equal to 65 MPa, or less than or equal to 45 MPa.

Alternatively the chemically toughened glass article can have a DoL (in μm) in the range of 27*t/CS μm to 0.5*t μm, in the range of 45*t/CS μm to 0.45*t μm, or in the range of 60*t/CS μm to 0.4*t μm, wherein t is given in μm and CS is the figure of surface compressive stress (given in MPa) measured at the first surface. The CT of these embodiments can be more than or equal to 27 MPa, such as more than or equal to 45 MPa, more than or equal to 65 MPa, or more than or equal to 100 MPa.

In some embodiments, the surface CS at the first surface and/or at the second surface of soda lime glasses can be equal to or more than 200 MPa, such as equal to or more than 300 MPa.

The glass articles can be used, for example, in the following application fields of display substrate or protection cover, fingerprint sensors cover, general sensor substrate or cover, cover glass of consumer electronics, protective covers of displays and other surfaces, especially bended surfaces. Moreover, the glass articles may also be used in the applications of display substrate and cover, fragile sensors, fingerprint sensor module substrate or cover, semiconductor package, thin film battery substrate and cover, foldable display, camera lens cover. In specific embodiments, the glass articles may be used as cover film for resistance screens, and expendable protective films for display screens, cell phones, cameras, gaming gadget, tablet, laptops, TV, mirror, windows, aviation widows, furniture, and white goods.

Exemplary embodiments provided according to the present invention are especially suitable for being used in flexible electronic devices providing thin, lightweight and flexible properties (e.g. curved displays, wearable devices). Such flexible devices also require flexible substrates e.g. for holding or mounting components. In addition flexible displays with high contact resistance and small bending radii are possible.

Further, exemplary embodiments provided according to the present invention are especially suitable for being used for forming a laminated layered structure, wherein the laminated layered structure comprises at least two ultrathin glass layers and an organic layer between them, wherein at least one glass layer is a chemically toughened glass article provided according to the present invention and wherein the organic layer may be selected from the group consisting of optical clear adhesive (OCA), optical clear resin (OCR), polyvinyl butyral (PVB), polycarbonate (PC), polyvinyl chloride (PVC) and thermoplastic polyurethane (TPU). A glass article in the form of a laminated layered structure described previously is also provided according to the present invention.

According to some embodiments provided according to the present invention, the ultrathin chemically toughened glass article is used for forming a laminated layered structure (also called "glass laminate"). The laminated layered structure comprises, for example, two ultrathin glass layers and an organic layer between them. At least one of these UTG layers is a glass article provided according to the present invention. In one case, the glass laminate comprises one toughened and one untoughened glass layer, wherein the toughened glass layer has at least one toughened surface which is located at the outer side of the glass laminate. Of course, both UTG layers can be glass articles provided according to the present invention (that means the glass laminate comprises two toughened glass layers). In the latter case, each glass layer may have at least one toughened surface which can be located at the outer side of the glass laminate. Of course the glass laminate can be composed of more than two ultrathin glass layers. Glass laminates having three, four, five and more UTG layers (toughened and/or untoughened in any combination) are also possible with organic layers between the UTG layers. An organic layer may be selected from the group consisting of optically clear adhesive (OCA), optically clear resin (OCR), polyvinyl butyral (PVB), polycarbonate (PC), polyvinyl chloride (PVC) and thermoplastic polyurethane (TPU). The method of making a such a glass laminate is known.

The glass laminate can comprise at least one toughened glass layer having a low DoL or having a high DoL. It may be advantageous if the glass laminate comprises a laminated polymer layer and/or a coated layer at least on one side wherein the polymer layer has a thickness of at least 1 μm, such as of at least 5 μm, of at least 10 μm, of at least 20 μm, or of at least 40 μm to reach the improved sharp contact resistance. The laminated polymer layer can completely or partly cover the surface of the glass laminate.

The glass laminate can comprise glass layers having the same thickness and/or DoL. Alternatively the glass laminate can comprise ultrathin glass layers with different thicknesses and/or different DoL. For example, the glass laminate can have the structure "0.05 mm glass layer+OCA/OCR+0.07 mm glass layer", wherein the glass layers have the same DoL (for example 6 μm). Another structure can be "0.05 mm glass layer (DoL 11 μm)+OCA/OCR+0.07 mm glass layer (DoL 4 μm).

Advantageously, a laminated layered structure may have a higher strength or stability compared to a monolithic glass article of the same thickness. At the same time, the layers of the laminated layered structure can be made of thin or very thin glass, thus enabling the layered structure to be thin and flexible without any effect on the overall strength or stability. Thus, the bending performance of a glass laminate may be even better than that of a monolithic glass article. For example, a glass laminate comprising two 0.05 mm toughened glass layers and an OCA layer between them may have a lower bending radius than a glass article having a thickness of 0.1 mm.

If a monolithic glass article is broken, it may ruin, for example, the display of an electronic device. A glass laminate offers more protection. Even if the ultrathin glass layer located at the outside of the glass article is ruined, there is still another glass layer on the backside for protection.

A method of producing a glass article according to the present invention is also provided. The method includes the following steps:
  a) Providing a composition of raw materials for the desired glass,
  b) Melting the composition,
  c) Producing a glass article in a flat glass process,
  d) Chemically toughening the glass article, and
  e) Optionally coating at least one surface of the glass article with a coating layer, and
  f) Optionally laminating at least one surface of the glass article with a polymer layer,
wherein the toughening temperature is between 340° C. to 480° C. and the toughening time is 30 seconds to 48 hours.

According to the method, the toughening temperature and/or toughening time is reduced in order to achieve an inventive glass article having an optimized stress profile.

The flat glass process may be a down draw process or a redraw process.

In some embodiments, the chemically toughening process comprises an ion-exchange process. For mass production it will be favorable if the ion-exchange process comprises immerging the glass article of a part of the glass article into a salt bath containing monovalent cations. The monovalent cations may be potassium ions and/or sodium ions.

For some glass types it may be advantageous if the chemical toughening comprises two consecutive toughening steps, wherein the first step comprises toughening with a first toughening agent and the second step comprises toughening with a second toughening agent. In some embodiments, the first toughening agent and the second toughening agent comprise or consist of $KNO_3$ and/or $NaNO_3$ and/or mixtures thereof.

Further details of the manufacturing and the toughening procedure have already been described previously.

DESCRIPTION OF EXEMPLARY EMBODIMENTS

Table 1 shows the compositions of several typical embodiments (types 1-5) of direct hot-forming ultrathin glasses which are chemically toughenable.

TABLE 1

Embodiments of direct hot-forming UTG composition of different glass types

| Composition (wt %) | Type 1 | Type 2 | Type 3 | Type 4 | Type 5 |
|---|---|---|---|---|---|
| $SiO_2$ | 61 | 62 | 64 | 70 | 80 |
| $Al_2O_3$ | 17 | 18 | 4 | — | 3 |
| $Li_2O$ | — | 5 | — | — | — |
| $Na_2O$ | 12 | 10 | 6 | 10 | 4 |
| $K_2O$ | 4 | 1 | 7 | 8 | — |
| MgO | 4 | — | — | — | — |
| CaO | — | 1 | — | 6 | — |
| BaO | — | — | — | 2.5 | — |
| ZnO | — | — | 6 | 4 | — |
| $ZrO_2$ | 2 | 3 | — | — | — |
| $B_2O_3$ | — | 1 | 8 | 0.1 | 12 |
| $TiO_2$ | — | — | 4 | — | — |

Glass articles 1 of the different glass types were produced in a down draw process and chemically toughened to form ultrathin chemically toughened glass articles. Each ultrathin glass article has a first surface 2 and a second surface 3. In the embodiments shown, each sample representing a glass article is toughened on both sides. So there is a compressive stress region with a certain depth (DoL) on each side of the glass article. All samples were cut out of a larger glass article by using diamond cutting wheel. The samples were tested without any further edge treatment (e.g. polishing, etching).

Comparison Embodiment—Glass Type 1

Many samples of glass type 1 having a length of 11 mm, a width of 11 mm and thicknesses of 0.05 mm, 0.07 mm, 0.1 mm, 0.145 mm, 0.21 mm were prepared and chemically toughened. Different toughening conditions (table 2) are employed to have different CS and DoL >10 μm. After ion-exchange, the toughened samples were cleaned and measured with FSM 6000.

The contact resistance against sharp hard objects was tested with the sandpaper ball drop test which was described in detail previously. A simplified illustration of that test is shown in FIG. 1. A glass article 1 is placed with its second surface 3 on a steel plate 4. The first surface 2 of the glass article 1 is orientated upwardly. A sandpaper 5 of type P180 is placed on the glass article in such a way that its abrasive side is in contact with the first surface 2 of the glass article 1. An acrylic ball 6 having a weight of 4.5 g is dropped from above onto the sandpaper 5. The breakage height (also called "(sandpaper) ball drop height") is the maximum height from that the ball can drop onto the glass sample until it gets a visible surface crack or breaks into two or several pieces. 20 toughened samples of each thickness and each DoL were tested and evaluated. The average breakage height was calculated as described previously, and the B10 height was calculated using Weibull method.

Further, for determining a breakage bending radius 20 toughened samples of each thickness and DoL were tested by using 20 mm×70 mm sized samples in the 2 point bending method described previously. The average breakage bending radius was calculated as described previously.

Figure 2:
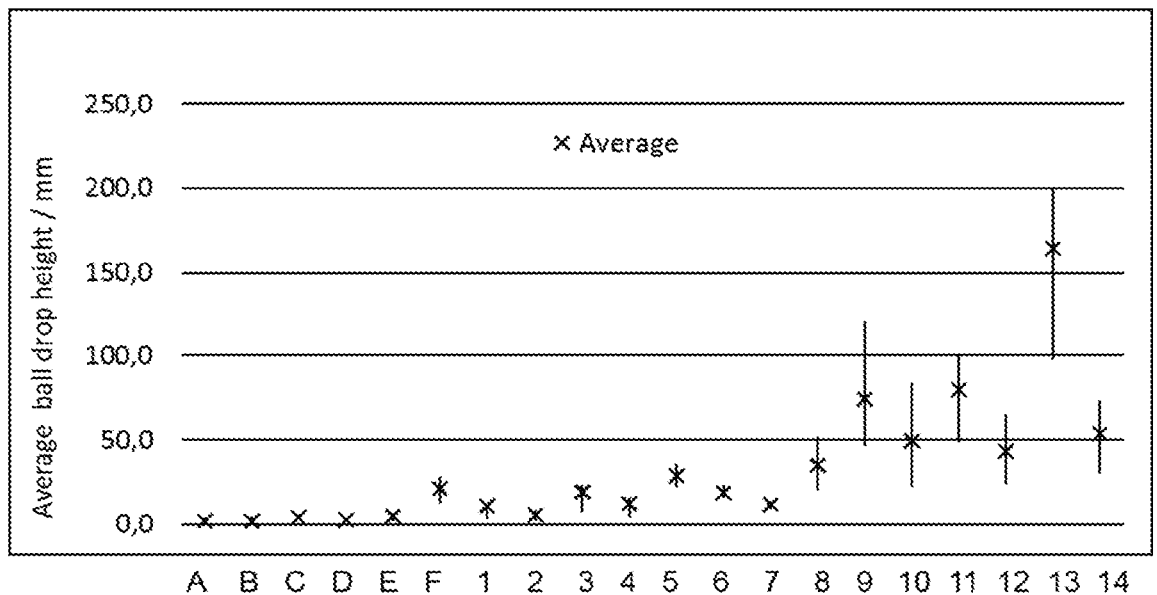
FIG. 2 is a chart illustrating average breakage force of comparison and working examples of a glass type 1.
Figure 3:
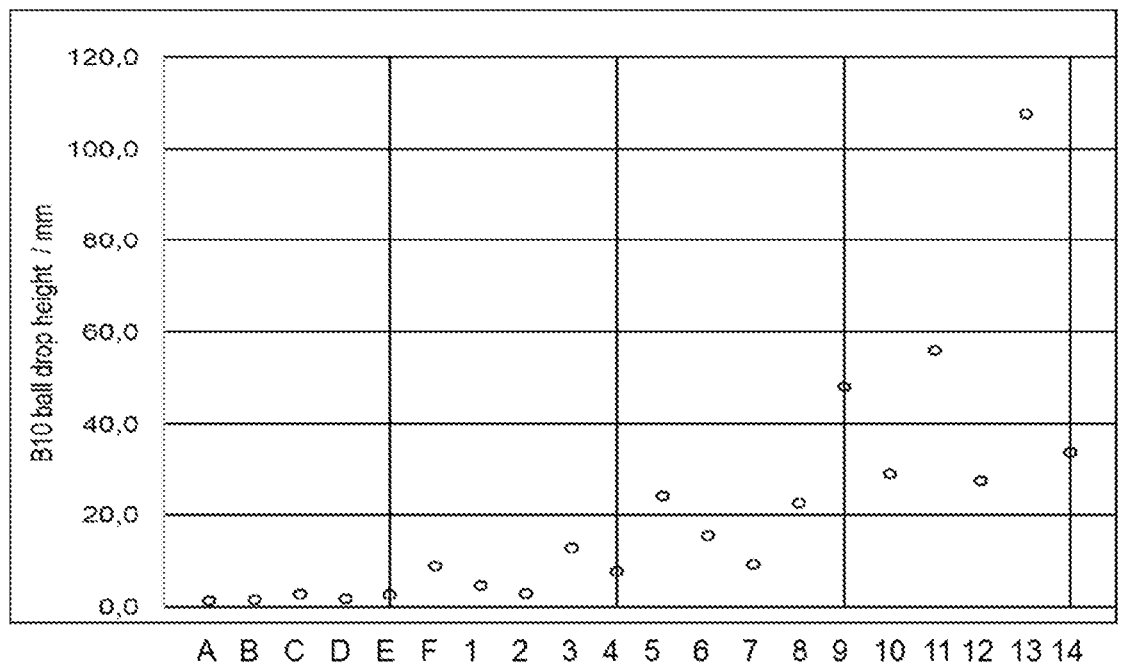
FIG. 3 is a chart illustrating B10 breakage force of comparison and working examples of a glass type 1.

Table 2 shows the test results concerning impact resistance and bending radius for the comparison examples A to F (average values and calculated B10 values using Weibull method). In FIG. 2 the results of the sandpaper ball drop test (average breakage height) are given for the comparison examples A to F. A vertical line indicates the spread of the measured values around the corresponding average value in each case. In FIG. 3 the calculated B10 heights are given for the comparison examples A to F.

TABLE 2

Glass type 1, toughening conditions and results (comparison examples)

| | | Comparison example | | | | | |
|---|---|---|---|---|---|---|---|
| | | A | B | C | D | E | F |
| Thickness (mm) | | 0.05 | 0.07 | 0.1 | 0.1 | 0.145 | 0.21 |
| Toughening condition | Temperature/° C. | 390 | 390 | 390 | 390 | 390 | 390 |
| | Time/min | 20 | 20 | 20 | 47 | 47 | 90 |
| CS/MPa | | 680 | 724 | 811 | 793 | 813 | 798 |
| DoL/μm | | 11 | 11 | 11 | 15 | 15 | 20 |
| CT/MPa | | 267 | 166 | 114 | 170 | 106 | 94 |
| Average sandpaper ball drop height/mm | | 1.8 | 2.3 | 4.2 | 2.6 | 4.7 | 25.6 |
| B10 for sandpaper ball drop/mm | | 1.3 | 1.6 | 2.8 | 1.8 | 2.7 | 8.8 |
| Average Breakage Bending radius/mm | | <3 | <6 | <7 | <6 | <10 | — |

Embodiment 1—Glass Type 1

Many samples of glass type 1 having a length of 11 mm, a width of 11 mm and thicknesses of 0.05 mm, 0.07 mm, 0.1 mm, 0.145 mm, 0.21 mm, 0.25 mm and 0.33 mm were prepared and chemically toughened. Different toughening conditions (Table 3) are employed to have different CS and DoL After ion-exchange, the toughened samples were cleaned and measured with FSM 6000.

The contact resistance against sharp hard objects was tested with the sandpaper ball drop test which was described in detail previously. A simplified illustration of that test is shown in FIG. 1. 20 toughened samples of each thickness and each DoL were tested and evaluated as described previously. Table 3 shows the average sandpaper ball drop height (=average breakage height, in the unit "mm") that can be applied until the glass samples are damaged corresponding to different DoL and different thicknesses. Further the calculated B10 height (in mm) are given. FIG. 2 shows the average breakage heights (the results of the sandpaper ball drop test) of samples having thicknesses of 0.05 mm, 0.07 mm, 0.1 mm, 0.145 mm, 0.21 mm, 0.25 mm and 0.33 mm and different DoL for working examples 1 to 14. A vertical line indicates the spread of the measured values around the corresponding average value in each case. In FIG. 3 the calculated B10 heights (sandpaper ball drop test) are given for the working examples 1 to 14.

Further, for determining an average breakage bending radius 20 toughened samples of each thickness and each DoL were tested by using 20 mm×70 mm sized samples in the 2 point bending method described previously and evaluated as described previously. As the samples are measured as cut (that means without any edge treatment) the bending radii of glass articles having treated edges will be even smaller.

TABLE 3

Glass type 1, toughening conditions and result

| | | Working ex. | | | | | | | |
|---|---|---|---|---|---|---|---|---|---|
| | | 1 | 2 | 3 | 4 | 5 | 6 | 7 | 8 |
| | Thickness (mm) | 0.05 | 0.05 | 0.07 | 0.07 | 0.1 | 0.1 | 0.1 | 0.145 |
| Toughening condition | Temperature/° C. | 390 | 390 | 390 | 390 | 390 | 390 | 390 | 390 |
| | Time/min | 2 | 5 | 2 | 5 | 2 | 5 | 10 | 5 |
| | CS/MPa | 706 | 704 | 764 | 760 | 793 | 833 | 828 | 845 |
| | DoL/μm | 4 | 6 | 4 | 6 | 4 | 6 | 9 | 6 |
| | CT/Mpa | 67 | 111 | 49 | 77 | 36 | 56 | 90 | 38 |
| Average sandpaper ball drop height/mm | | 13.7 | 5.7 | 23 | 12.5 | 29 | 18.7 | 11.5 | 34.8 |
| B10 for sandpaper ball drop/mm | | 7.6 | 3.0 | 12.7 | 7.8 | 24.0 | 15.4 | 9.2 | 22.6 |
| Average breakage bending radius/mm | | <4 | <3 | <6 | <5 | <9 | <9 | <7 | <12 |

| | | Working ex. | | | | | |
|---|---|---|---|---|---|---|---|
| | | 9 | 10 | 11 | 12 | 13 | 14 |
| | Thickness (mm) | 0.21 | 0.21 | 0.25 | 0.25 | 0.33 | 0.33 |
| Toughening condition | Temperature/° C. | 390 | 390 | 390 | 390 | 390 | 390 |
| | Time/min | 2 | 10 | 5 | 20 | 5 | 47 |
| | CS/MPa | 818 | 810 | 832 | 830 | 845 | 820 |
| | DoL/μm | 4 | 10 | 6 | 11 | 6 | 15 |
| | CT/Mpa | 20 | 43 | 21 | 38 | 16 | 41 |
| Average sandpaper ball drop height/mm | | 73.9 | 49.6 | 79.5 | 43.1 | 164.2 | 53.7 |
| B10 for sandpaper ball drop/mm | | 48.1 | 28.8 | 56 | 27.4 | 107.8 | 33.8 |
| Average breakage bending radius/mm | | — | — | — | — | — | — |

Looking at FIGS. 2 and 3 it can be seen that, for example, 0.1 mm thick glass type 1 samples with a DoL of less than 10 μm (examples 5-7) have higher average sandpaper ball drop height and higher B10 ball drop height until breakage than samples of the same thickness with a higher DoL (comparison examples C and D). Thus, the working examples are quite more resistant against high sharp impact contact than the comparison examples. The same results can be seen when comparing other examples of corresponding thicknesses (e.g. 0.05 mm, 0.07 mm, 0.21 mm) with one another (comparison examples versus working examples). Further the figures show that both the average ball drop height and the B10 ball drop height increase when DoL decreases, referred to working examples having the same thickness (e.g. working examples 5-7 or working examples 9 and 10). The different DoLs are realized by varying the toughening conditions (in this case, the toughening time at a quite low toughening temperature), as shown in Tables 2 and 3.

In some embodiments, 0.1 mm thick ultrathin glass is toughened to get surface CS of 828 MPa and DoL of 9 μm, and the resultant CT is only 90 MPa (Ex. 7). The glass article has a B10 ball drop height of 9.2 mm. Thus, its breakage height (in mm) is >5 (calculated by: ≥50*0.1). In addition, the average breakage bending radius of that embodiment is <7 mm. Thus its breakage bending radius is within the criterion "<12" (as calculated by: <100000*0.1/828), and even more within the criterion "<7.2" (as calculated by: <60000*0.1/828). Thus, such a glass articles has an optimized stress profile with a balance between high flexibility (small bending radius) and high sharp contact resistance.

On the contrary, comparison example C is a 0.1 mm thick ultrathin glass and is toughened to get surface CS of 811 MPa and DoL of 11 μm, and the resultant CT is 114 MPa. The glass article has a B10 ball drop height of 4.2. Thus its breakage height (in mm) is <5 (calculated by: 50*0.1). The average breakage bending radius of that embodiment is <7 mm. Thus its breakage bending radius is within the criterion "<12" (as calculated by: <100000*0.1/811), and even more within the criterion "<7.4" (as calculated by: <60000*0.1/811). Although the bending radius of this comparison example is acceptable, such a glass article is less suitable to become part of a product as it has not got an optimized stress profile with a balance between high flexibility (small bending radius) and high sharp contact resistance. Its breakage height (ball drop height) is too low.

Embodiment 2—Glass Type 1 with High DoL, Laminated

Figure 4:
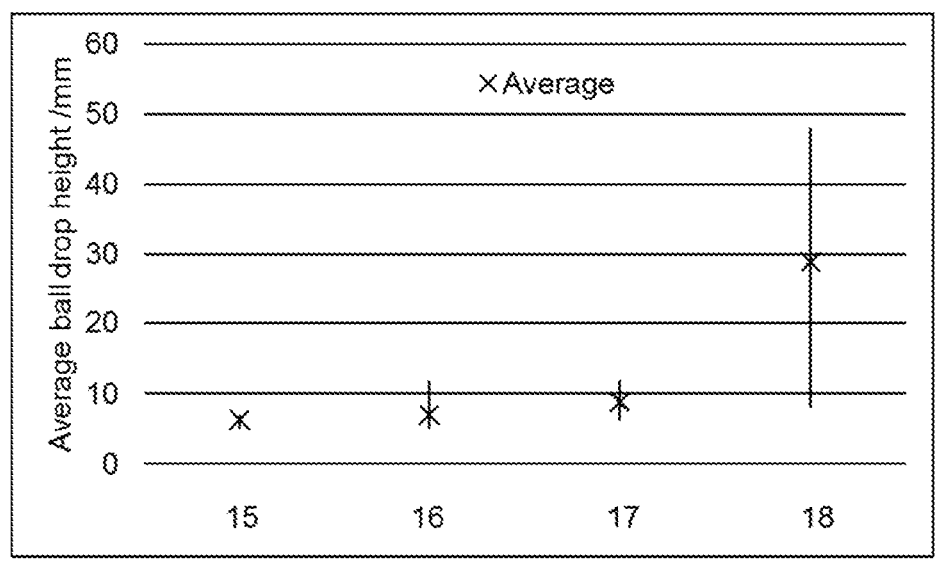
FIG. 4 is a chart illustrating average breakage force of working examples of a glass.
Figure 5:
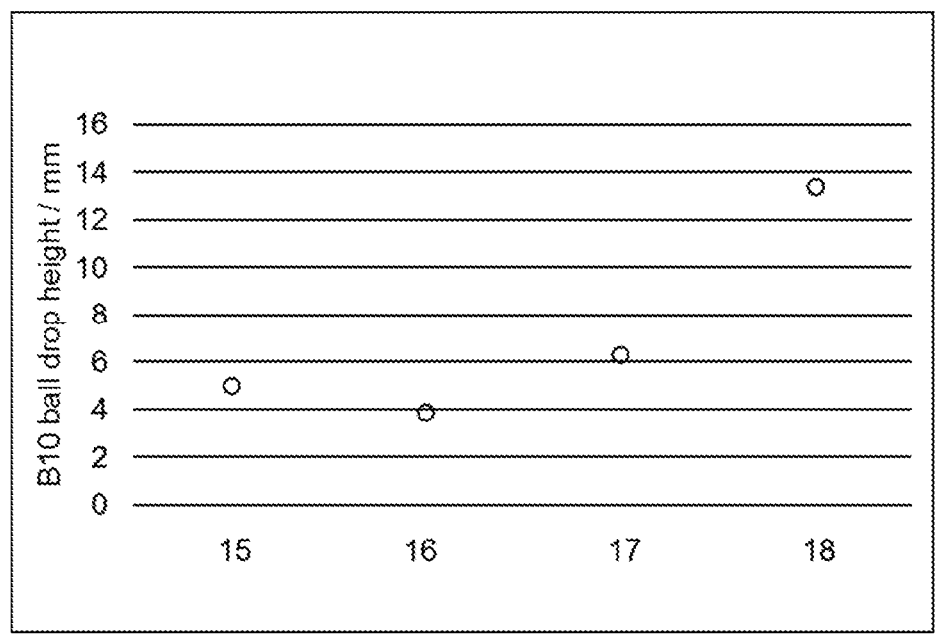
FIG. 5 is a chart illustrating B10 breakage force of working examples of a glass.

Many samples of glass type 1 having a length of 11 mm, a width of 11 mm and a thickness of 0.1 mm were prepared and chemically toughened. The toughening conditions are employed to have CS of 717 MPa and DoL of 28 μm. After ion-exchange, the toughened samples were cleaned and measured with FSM 6000. PE or PET films of different thicknesses (here 10 μm or 50 μm) were laminated on the glass samples (Examples 15-18). Then the contact resistance against sharp hard objects were tested by a sharp impact experiment (sandpaper ball drop test) as described previously. In each experiment, 20 samples of each kind of lamination treatment were tested and evaluated as described in connection with embodiment 1. Table 4 shows the sample conditions and results of the experiments. The related FIG. 4 shows the sandpaper ball drop test results (average breakage height) for corresponding working examples. FIG. 5 shows the calculated B10 heights for corresponding working examples.

As can be seen from FIGS. 4 and 5, Examples 17 and 18 have an improved resistance against sharp impact forces although the DoL of the samples is quite high. This is achieved by laminating a polymer layer on the glass wherein a thicker polymer layer of 50 μm is a better protection against sharp impact forces than thinner ones. Ex. 15 are glass samples without a lamination. Due to the properties of the lamination material a 50 μm layer of PET seems to have a better effect than a 50 μm layer of PE.

TABLE 4

Glass type 1 (0.1 mm, high DoL), laminated (toughening conditions and results)

|  |  | Ex. 15 Glass | Ex. 16 Glass + 10 μm PE | Ex. 17 Glass + 50 μm PE | Ex. 18 Glass + 50 μm PET |
|---|---|---|---|---|---|
| Toughening condition | Temperature/ ° C. |  |  | 390 |  |
|  | Time/min |  |  | 160 |  |
|  | CS/MPa |  |  | 717 |  |
|  | DoL/μm |  |  | 28 |  |
|  | CT/MPa |  |  | 456 |  |
| Average sandpaper ball drop height/mm |  | 6.2 | 6.9 | 8.8 | 29 |
| B10 for sandpaper ball drop/mm |  | 5.0 | 3.9 | 6.3 | 13.4 |

Embodiment 3—Glass Type 2

Samples of glass type 2 having a length of 11 mm, a width of 11 mm and thicknesses of 0.1 mm, 0.25 mm, and 0.33 mm were prepared and chemically toughened. Different toughening conditions are used to have different CS and DoL. Example 19 was toughened in one step, while examples 20 to 22 are toughened in two steps. After ion-exchange, the toughened samples were cleaned and measured with FSM 6000. Then the contact resistance against sharp hard objects were tested by a sharp impact experiment (sandpaper ball drop test) as described previously. In addition, the breakage bending radius was measured by the 2 point bending method described previously using samples having a length of 70 mm and a width of 20 mm. In each test/experiment, a plurality of 20 samples of each thickness and each DoL-type were tested and evaluated as described in connection with embodiment 1. Table 5 shows the sample conditions and results of the experiments (working examples 19-22).

TABLE 5

Glass type 2 (0.1 mm, 0.25 mm, 0.33 mm), toughening conditions and results

|  |  | Ex. 19 | Ex. 20 | Ex. 21 | Ex. 22 |
|---|---|---|---|---|---|
| thickness (mm) |  | 0.1 | 0.1 | 0.25 | 0.33 |
| Toughening condition | Step 1 | 420° C. 1 h 100% $KNO_3$ | 380° C. 1 h 45% $NaNO_3$ + 55% $KNO_3$ | 420° C. 12 h 100% $NaNO_3$ | 420° C. 6 h 100% $NaNO_3$ |
|  | Step 2 | — | 380° C. 1 h 20% $NaNO_3$ + 80% $KNO_3$ | 420° C. 2 h 100% $KNO_3$ | 420° C. 1 h 100% $KNO_3$ |
| CS/MPa | Layer 1 | 792 | 430 | 750 | 782 |
|  | Layer 2 | — | 43 | 58 | 73 |
| DoL/μm | Layer 1 | 4.0 | 3 | 4.5 | 3 |
|  | Layer 2 | — | 20 | 55 | 41 |
| CT/MPa |  | 34 | 42 | 52 | 23 |
| Average sandpaper ball drop height/mm |  | 34 | 22.4 | 42.3 | 85.1 |
| B10 for sandpaper ball drop/mm |  | 29.3 | 17.2 | 25.7 | 58.3 |
| Average breakage bending radius/mm |  | <12 | <20 | — | — |

Embodiment 4—Glass Type 3

Samples of glass type 3 having a length of 11 mm, a width of 11 mm and a thickness of 0.21 mm were prepared and chemically toughened. Different toughening conditions are used to have different CS and DoL. After ion-exchange, the toughened samples were cleaned and measured with FSM 6000. Then the contact resistance against sharp hard objects were tested by sharp impact experiment (sandpaper ball drop test) as described previously. In addition, the breakage bending radius was measured by the 2 point bending method described previously using samples of each thickness having a length of 70 mm and a width of 20 mm. In each test/experiment, a plurality of 20 samples of each DoL were tested and evaluated as described in connection with embodiment 1. Table 6 shows the sample conditions and results of the experiments (working examples 23-25).

TABLE 6

Glass type 3 (0.21 mm), toughening conditions and results

|  |  | Ex. 23 | Ex. 24 | Ex. 25 |
|---|---|---|---|---|
|  | Thickness (mm) | 0.21 | 0.21 | 0.21 |
| Toughening condition | Temperature/° C. | 400 | 400 | 400 |
|  | Time/h | 1 | 2 | 4 |
|  | CS/MPa | 367 | 352 | 324 |
|  | DoL/μm | 9.8 | 14.1 | 19.5 |
|  | CT/MPa | 19 | 27 | 37 |
| Average sandpaper ball drop height/mm |  | 50.7 | 43.1 | 31.9 |
| B10 for sandpaper ball drop/mm |  | 33.1 | 29.8 | 24.6 |
| Average breakage bending radius/mm |  | — | — | — |

Embodiment 5—Glass Type 4

Samples of glass type 4 having a length of 11 mm, a width of 11 mm and a thickness of 0.145 mm were prepared and chemically toughened. Different toughening conditions are used to have different CS and DoL. After ion-exchange, the toughened samples were cleaned and measured with FSM 6000. Then the contact resistance against sharp hard objects were tested by sharp impact experiment (sandpaper ball drop test) as described previously. In addition, the breakage bending radius was measured by the 2 point bending method described previously using samples of each thickness having a length of 70 mm and a width of 20 mm. In each test/experiment, a plurality of 20 samples of each DoL were tested and evaluated as described in connection with embodiment 1. Table 7 shows the sample conditions and results of the experiments (working examples 26-28).

TABLE 7

Glass type 4 (0.145 mm), toughening conditions and results

|  |  | Ex. 26 | Ex. 27 | Ex. 28 |
|---|---|---|---|---|
|  | Thickness (mm) | 0.145 | 0.145 | 0.145 |
| Toughening condition | Temperature/° C. | 420 | 420 | 420 |
|  | Time/h | 1 | 2 | 4 |
|  | CS/MPa | 310 | 301 | 297 |
|  | DoL/μm | 7.8 | 11 | 16.4 |
|  | CT/MPa | 19 | 27 | 43 |
| Average sandpaper ball drop height/mm |  | 56 | 41 | 34.2 |
| B10 for sandpaper ball drop/mm |  | 33.7 | 26 | 19.8 |
| Average breakage bending radius/mm |  | — | — | — |

The CT of this glass type is very low. However, it can have better impact resistance to sharp and hard objects, even if the CS is not high.

Embodiment 6—Glass Type 5

Samples of glass type 5 having a length of 11 mm, a width of 11 mm and a thickness of 0.1 mm were prepared and chemically toughened. Different toughening conditions are used to have different CS and DoL. After ion-exchange, the toughened samples were cleaned and measured with FSM 6000. Then the contact resistance against sharp hard objects were tested by a sharp impact experiment (sandpaper ball drop test) as described previously. In addition, the breakage bending radius was measured by the 2 point bending method described previously using samples having a length of 70 mm and a width of 20 mm. In each test/experiment, a plurality of 20 samples of each DoL were tested and evaluated as described in connection with embodiment 1. Table 8 shows the sample conditions and results of the experiments (working examples 29-31).

TABLE 8

Glass type 5 (0.1 mm), toughening conditions and results

|  |  | Ex. 29 | Ex. 30 | Ex. 31 |
|---|---|---|---|---|
| Toughening condition | Temperature/° C. | 420 | 430 | 430 |
|  | Time/h | 2 | 6 | 15 |
|  | CS/MPa | 148 | 142 | 137 |
|  | DoL/μm | 4.4 | 7.6 | 12 |
|  | CT/MPa | 7 | 13 | 22 |
| Average sandpaper ball drop height/mm |  | 56 | 45 | 38.7 |
| B10 for sandpaper ball drop/mm |  | 46.3 | 37.5 | 24.8 |
| Average breakage bending radius/mm |  | <70 | <60 | <50 |

In general, the strength of the ultrathin chemically toughened glass articles provided according to the present invention, which is determined by the sandpaper ball drop test, follows Weibull distribution. B10 values defining the heights when 10% of the samples are broken are given in Tables 2-7.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A chemically toughened glass article comprising a glass and having a thickness t of less than or equal to 0.07 mm, a first surface, and a second surface and a compressive stress region extending from the first surface to a first depth in the glass article DoL, the compressive stress region being defined by a compressive stress and a surface compressive stress at the first surface is at least 600 MPa, the glass article having a breakage height, in mm, of at least a figure of the thickness, in mm, of the glass article multiplied by 50, the breakage height being determined in a sandpaper ball drop test in which the glass article is placed with its second surface on a steel plate and the first surface of the glass article is loaded until breakage by a 4.5 g acrylic ball dropped from above and a sandpaper of type P180 is placed on the first surface of the glass article with an abrasive side of the sandpaper in contact with the first surface, the glass article having a breakage bending radius, in mm, of less than the thickness, in mm, of the article multiplied by 100000, wherein the result is divided by the figure of the surface compressive stress, in MPa, measured at the first surface, wherein the glass comprises the following components in the indicated amounts (in wt. %):
   $SiO_2$ 40-75%;
   $Al_2O_3$ 10-30%;
   $B_2O_3$ 0-3%;
   $Li_2O+Na_2O+K_2O$ 4-30%;
   $MgO+CaO+SrO+BaO+ZnO$ 0-15%;
   $TiO_2+ZrO_2$ 0-15%; and
   $P_2O_5$ 0-10%; wherein the glass comprises $Li_2O$ in an amount of at most 2 wt. % and the glass comprises $ZrO_2$ in an amount of at least 1 wt. %.

2. The chemically toughened glass article of claim 1, wherein the glass article has a thickness of ≤0.05 mm.

3. The chemically toughened glass article of claim 1, wherein the article has a DoL, in μm, in a range of 0.5 μm to 120*t/CS μm, wherein t is given in μm and CS is the figure of surface compressive stress, given in MPa, measured at the first surface.

4. The chemically toughened glass article of claim 1, wherein the glass article has a central tensile stress CT of less than or equal to 200 MPa.

5. The chemically toughened glass article of claim 1, wherein the article has a DoL, in μm, in the range of 27*t/CS μm to 0.5*t μm, wherein t is given in μm and CS is the figure of surface compressive stress, given in MPa, measured at the first surface.

6. The chemically toughened glass article of claim 5, wherein the glass article has a central tensile stress CT of at least 27 MPa.

7. The chemically toughened glass article of claim 1, wherein the glass article further comprises a laminated polymer layer, the polymer layer having a thickness of at least one of ≥1 μm or <200 μm.

8. The chemically toughened glass article of claim 1, wherein the glass article comprises a coated layer at least at one surface, the coated layer comprising a coating material.

9. The chemically toughened glass article of claim 1, wherein the glass article has a second compressive stress region extending from the second surface to a second depth in the glass article DoL, the second compressive stress region being defined by a compressive stress and a surface compressive stress at the second surface is at least 600 MPa.

10. The chemically toughened glass article of claim 9, wherein at least one of the surface compressive stress CS of the glass article at the first surface or the surface compressive stress CS of the glass article at the second surface is more than 700 MPa.

11. The chemically toughened glass article of claim 1, wherein the glass article is at least one of a flat article, a flexible article, or a deformable article.

12. The chemically toughened glass article of claim 1, wherein the glass is free of $Li_2O$.

13. A laminated layered structure, comprising:
   at least two glass layers, at least one of the glass layers comprising a chemically toughened glass and having a thickness t of equal to or less than 0.07 mm, a first surface, and a second surface and a compressive stress region extending from the first surface to a first depth in the glass layer DoL, the compressive stress region being defined by a compressive stress and a surface compressive stress at the first surface is at least 600 MPa, the at least one glass layer having a breakage height, in mm, of at least a figure of the thickness, in mm, of the at least one glass layer multiplied by 50, the breakage height being determined in a sandpaper ball drop test in which the at least one glass layer is placed with its second surface on a steel plate and the first surface of the at least one glass layer is loaded until breakage by a 4.5 g acrylic ball dropped from above and a sandpaper of type P180 is placed on the first surface of the at least one glass layer with an abrasive side of the sandpaper in contact with the first surface, the at least one glass layer having a breakage bending radius, in mm, of less than the thickness, in mm, of the layer multiplied by 100000, wherein the result is divided by the figure of the surface compressive stress, in MPa, measured at the first surface, wherein the glass comprises the following components in the indicated amounts (in wt. %):
   $SiO_2$ 40-75%;
   $Al_2O_3$ 10-30%;
   $B_2O_3$ 0-3%;
   $Li_2O+Na_2O+K_2O$ 4-30%;
   $MgO+CaO+SrO+BaO+ZnO$ 0-15%;
   $TiO_2+ZrO_2$ 0-15%; and $P_2O_5$ 0-10%; wherein the glass comprises $Li_2O$ in an amount of at most 2 wt. % and the glass comprises $ZrO_2$ in an amount of at least 1 wt. %; and an organic layer placed between the at least two glass layers.

14. A chemically toughened glass article comprising a glass and having a thickness t of equal to or less than 0.05 mm, a first surface, and a second surface and a compressive stress region extending from the first surface to a first depth in the glass article DoL, the compressive stress region being defined by a compressive stress and a surface compressive stress at the first surface is at least 700 MPa, the glass article having a breakage height, in mm, of at least a figure of the thickness, in mm, of the glass article multiplied by 50, the breakage height being determined in a sandpaper ball drop test in which the glass article is placed with its second surface on a steel plate and the first surface of the glass article is loaded until breakage by a 4.5 g acrylic ball dropped from above and a sandpaper of type P180 is placed on the first surface of the glass article with an abrasive side of the sandpaper in contact with the first surface, the glass article having a breakage bending radius, in mm, of less than the thickness, in mm, of the article multiplied by 100000, wherein the result is divided by the figure of the surface compressive stress, in MPa, measured at the first surface, wherein the glass comprises the following components in the indicated amounts (in wt. %):

$SiO_2$ 40-75%;
$Al_2O_3$ 10-30%;
$B_2O_3$ 0-3%;
$Li_2O+Na_2O+K_2O$ 4-30%;
$MgO+CaO+SrO+BaO+ZnO$ 0-15%;
$TiO_2+ZrO_2$ 0-15%; and
$P_2O_5$ 0-10%; wherein the glass comprises $Li_2O$ in an amount of at most 2 wt. % and the glass comprises $ZrO_2$ in an amount of at least 1 wt. %.

15. The chemically toughened glass article of claim 14, wherein the article has a DoL, in μm, in the range of 60*t/CS μm to 0.4*t μm, wherein t is given in μm and CS is the figure of surface compressive stress, given in MPa, measured at the first surface.

16. The chemically toughened glass article of claim 14, wherein the glass article has a central tensile stress CT of at least 100 MPa.

* * * * *